United States Patent [19]

Abolins et al.

[11] 4,233,199

[45] Nov. 11, 1980

[54] FLAME RESISTANT THERMOPLASTIC COMPOSITIONS WITH WELL BALANCED PHYSICAL PROPERTIES

[76] Inventors: Visvaldis Abolins, 15 Haddington La., Delmar, N.Y. 12054; Fred F. Holub, 2263 Preisman Dr., Schenectady, N.Y. 12305; Popkin R. Shenian, 46 Tamarack Dr., Delmar, N.Y. 12054

[21] Appl. No.: 54,404

[22] Filed: Jul. 3, 1979

[51] Int. Cl.² ............................................. C08K 5/52
[52] U.S. Cl. ............................ 260/30.6 R; 260/42.22; 260/42.37; 260/42.43; 260/42.47; 260/DIG. 24
[58] Field of Search ............ 260/30.6 R, 42.37, 42.22, 260/DIG. 24, 42.43, 42.47

[56] References Cited

U.S. PATENT DOCUMENTS

| | | |
|---|---|---|
| 3,257,357 | 6/1966 | Stamatoff . |
| 3,257,358 | 6/1966 | Stamatoff . |
| 3,306,874 | 2/1967 | Hay . |
| 3,306,875 | 2/1967 | Hay . |
| 3,383,435 | 5/1968 | Cizek . |
| 3,639,506 | 2/1972 | Haaf . |
| 4,113,797 | 9/1978 | Lee, Jr. ....................... 260/30.6 R X |

*Primary Examiner*—Howard E. Schain

[57] ABSTRACT

The heat retardant properties of compositions comprising polyphenylene ether resins and styrene resins are significantly improved while maintaining a good overall balance of physical properties by including therein a combination of a flame retarding organophosphorus compound and a finely particulate solid material of a porous character.

13 Claims, No Drawings

FLAME RESISTANT THERMOPLASTIC COMPOSITIONS WITH WELL BALANCED PHYSICAL PROPERTIES

This invention relates to flame retardant thermoplastic compositions involving mixed synthetic resin ingredients, and more particularly such compositions based upon combinations of a polyphenylene ether resin and a styrene type resin wherein an organophosphorus type of flame retardant additive is utilized and a good balance of physical properties is still achieved by using as a complementary additive a porous structured finely particulate solid filler.

BACKGROUND OF THE INVENTION

Blends of a polyphenylene ether resin and a styrene type resin are known in the art and described in Cizek, U.S. Pat. No. 3,383,435, incorporated herein by reference. Th polyphenylene ether resin contains repeating structural units conforming to the general formula:

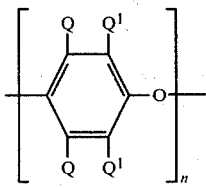

wherein the ether oxygen atom of one unit is connected to the benzene nucleus of the next adjoining unit; n is a positive integer equal to at least 50 and each of Q and $Q^1$ is a monovalent substituent selected from the group consisting of hydrogen, halogen, hydrocarbon radicals, halohydrocarbon radicals, hydrocarbonoxy radicals and halohydrocarbonoxy radicals provided that none of said radicals contains an alpha-carbon atom which is tertiary or bears a halogen substituent. Examples of such polyphenylene ethers and methods for producing same may be found in Hay, U.S. Pat. No. 3,306,874 and 3,306,875, and Stamatoff, U.S. Pat. No. 3,257,357 and 3,257,358, each of which is incorporated herein by reference.

The styrene type resin, as is described in the above noted Cizek patent, has at least 25 percent by weight polymer units derived from a compound corresponding to the formula:

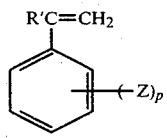

where R' is hydrogen, lower alkyl or halogen, Z is a member of the group consisting of vinyl, halogen and lower alkyl; and p is a whole number equal to from 0 to 5. Typical styrene type resins include, by way of example, homopolymers such as polystyrene and polychlorostyrene, and the modified polystyrenes such as rubber modified polystyrene (high impact polystyrenes), and styrene containing copolymers such as the styrene-acrylonitrile copolymers (SAN), styrene-butadiene copolymers, styrene-acrylonitrile-alpha-alkyl styrene copolymers, styrene-acrylonitrile-butadiene copolymers (ABS), poly-alpha-methyl styrene, copolymers of ethylvinyl benzene and divinyl benzene, and the like.

The inadequate flame retardant properties of thermoplastic compositions produced by blending styrene resins with polyphenylene ether resins have been recognized heretofore, and attention has been directed to the use of flame retardant additives therein. For example, Haaf, U.S. Pat. No. 3,639,506, incorporated herein, describes the ability of various flame retardant additives to render such polymer blends "self-extinguishing" and "non-dripping" according to ASTM test method D635 and Underwriter's Laboratories Bulletin No. 94. However, said Haaf patent also discloses that other properties of such polymer compositions, such as their "heat distortion temperatures", are adversely affected by the presence of effective amounts of the chosen flame retardant additives, particularly those of the aromatic organic phosphate type, e.g., triphenyl phosphate.

A primary object of the present invention is to provide thermoplastic compositions based upon compositions of styrene type resins and polyphenylene ether resins in which increased flame retardant performance is achieved while maintaining an overall balance of physical properties.

Another object of this invention is to provide highly flame retardant resin compositions of the subject class which exhibit unexpectedly high heat distortion temperatures under load (ASTM D648). A further object is to provide practical molding compositions of the subject class which can be readily fabricated into finished articles with well balanced physical properties.

DESCRIPTION OF THE INVENTION

The above objects and associated advantages are achieved in accordance with the present invention by forming blended thermoplastic resin compositions comprising:
  (a) a polyphenylene ether resin;
  (b) a styrene type resin;
  (c) a liquid or low melting organophosphorus compound; and
  (d) a finely particulate solid filler having a relatively high absorption capacity for organic liquids.

The above (a) and (b) resin components are preferably combined in proportions of between 1:4 and 4:1 by weight with poly-(2,6-dimethyl-1,4-phenylene) ethers being particularly preferred as component (a) and high impact (rubber modified) styrene polymers being preferred for component (b).

The oranophosphorus compound (c) is generally a derivative of phosphine or one of the phosphorus acids. Preferred are those compounds which are normally liquids or solids of relatively low melting point (e.g., below about 100° C.) but which are stable and relatively non-volatile at temperatures conventionally used in milling, processing and fabricating thermoplastic resin compositions of the subject class (i.e., generally in in a range of about 200° to 325° C.). Prominent among the most desirable and readily available liquid or low melting solid organophosphorus compounds are the phosphine oxides, the phosphonic and phosphinic acids and their esters, and the esters and partial esters of the various phosphoric and phosphorous acids, including their condensed or complexed polyacid forms.

The proportion in which said organophosphorous compound (c) is employed will generally range between about 4 and about 25 parts by weight per 100 parts of resin compositions (a) and (b) combined. Preferably, the concentration of said compound (c) will lie between about 5 and about 20 parts by weight per 100 parts of (a) and (b) combined.

Although more than three organo substituents can be present in a molecule of complex condensed or polymeric phosphorus compound, the most popular organophosphorous fire retardant additives contain 1 to 3 organic substituents per molecule. Although these substituents may be any of the aromatic, aliphatic or cycloaliphatic types, aryl or aryl-containing structures are generally preferred, which encompasses both substituted aryl and aryl-substituted alkyl groups. In fact, it is particularly preferred that aryl structures dominate the organic portions of the phosphorus compounds, making diaryl-and triaryl-substituted phosphorus derivatives the most preferred fire retardant additives in the present invention.

Typical examples of suitable organophosphate compounds include triphenyl phosphate, tricresyl phosphate, trixylyl phosphate, cresyl, cresyl diphenyl phosphate, modified triphenyl phosphates (e.g., certain commercial products sold by FMC under the KRONITEX ® trademarks) in which some of the phenyl groups have at least one pendent alkyl group substituent such as isopropyl, t-butyl, etc. (averaging in said commercial products between about 1 and 3 alkyl groups per molecule of the modified triphenyl phosphate), 2-ethyl hexyl diphenyl phosphate, phenyl bisneopentyl phosphate, halogenated triphenyl phosphate, 2-cloroethyl diphenyl phosphate, diphenyl hydrogen phosphate, tridodecyl phosphate, tris-(p-bromophenyl) phosphate, and the like.

Suitable exemplary organophosphorus compounds other than phosphates include tribenzylphosphite, triphenyl phosphite, diphenyl phosphite, diphenyl isodecyl phosphite, trilauryl phosphite, trilauryl tirthiophosphite, di(isooctyl) octylphenyl phosphite, distearyl pentaerythritol diphosphite (WESTON 618), di(decyl) decylphosphonate, di(benzyl) benzylphosphonate, neopentylglycol phenylphosphonate, pentaerythritol bis(-benzylphosphonate), triphenyl phosphine oxide and the like.

The finely particulate solid filler (d) of the present invention is characterized by an openly porous or expanded network structure capable of absorbing or imbibing organic liquids in relatively large proportions. It is vitally important that fillers meeting said qualifying guidelines be employed as ingredient (d) in the present composition in order that an acceptable heat distortion temperature can be achieved using proportions of ingredient (d) not greatly exceeding the proportions of organophosphorus compound (c) employed, because it has been found that maintaining such an approximate balance in the proportions of (c) and (d) assures effective performance of their rols as complementary minor ingredients and the attainment of a good overall balance of other physical properties in the products of this invention, including impact strength. Accordingly, the proportion of particulate solid filler (d) should range between about 2 and about 30 parts by weight per 100 parts of resins (a) and (b) combined, and optimally should be adjusted so that the weight ratio of (d) to (c) lies between about 1 to 3 and about 3 to 1.

Many different kinds of particulate solid fillers are capable of meeting said qualifying guidelines. Thus, in addition to mineral fillers and synthetic inorganic powders, various open-celled porous or expanded organic solids (such as plastic foams of thermostat or cross-linked polymeric resins) are also suitable provided they are sufficiently refractory to remain rigid and unfused during the usual heat processing steps involved in mixing, milling, plasticizing and shaping the blended thermoplastic compositions of the present invention.

Among solid fillers meeting the specified requirements as to fineness and rigidity and integrity of its primary particles, the most critical criterion for selecting those most suitable for use in the present invention is the oil absorption capacity of the filler, which should be relatively high.

Typical examples of some of the most readily available, finely paticulate solid fillers capable of use as ingredient (d) include the following subclasses:

(1) Diatomaceous silicas.

These are light weight, porous mineral powders composed essentially of the weathered, siliceous skeletal remains of various diatoms and other protophyte. They are economically mined from large sedimentary deposits found in many locations throughout the world. Most commercial grades have average particle sizes ranging from about 1 to about 25 microns, ASTM rubout oil absorption values generally well over 100% and often as high as 150% or more, and specific surface areas generally in a range from about 1 to 40 sq. meters per gram. The most preferred grades for use in the present invention are those which have been calcined to reduce the moisture content from the usual naturally occurring levels of about 3 to 6% by weight to less than 1% by weight, since this tends to maximize oil absorption capacity and compatibility with other ingredients of the subject thermoplastic compositions.

(2) Porous zeolites and related Silicate minerals (e,g, open lattice clays and volcanic residues)

This metal silicate group of mineral fillers is more complex and less uniform in character than the diatomaceous silica subclass, generally requires greater fractionation for particle size selection and is, therefore, more variable in suitability and performance in the present invention. Many of the zeolites and clays naturally occur in a highly hydrated state and can be rendered much more suitable by careful calcination treatments. Even the residual volcanic ash type minerals such as perlite and pumice, which do not normally contain large amounts of moisture, can usually be popped or expanded by proper heat treatment with resulting increases in porosity and oil absorption capacity.

(3) Fumed oxides of Metals or Metalloids

Fumed oxides are formed by condensation, or pyrogenic reactions at high temperatures, from a vapor state and generally are characterized by very small primary particles, often averaging less than one micron, and seldom more than a few microns in equivalent diameter. Because of the fineness of the primary particles of fumed oxides, their oil absorption capacity is due more to the three dimensional network of secondary aggregates therein than to the degree of porosity of the primary particles. Some excellent fumed oxide fillers of this type are commercially available including silicas and aluminas with average sizes of as large as about 5 microns or considerably smaller than 1 micron. Oil absorption capacity and compatibility of such particulate fillers can often be increased by surface treatments thereof with organic siloxanes or organosilane type compounds and the like.

(4) Wet process or precipitated oxides

These products tend to be somewhat coarser, less highly structured in secondary aggregate network and generally lower in oil absorption and suitability for use in the present invention than corresponding oxides of the fumed subclass discussed above.

(5) Porous or Expanded Rigid Organic Fillers

These materials are generally obtained by foaming various thermosetting or cross-linkable polymers during the heat processing steps employed to carry out the last stages of the cross-linking or polymerization reactions by means of which said polymers are converted to the rigid infusible state. The necessary foaming can be effected by different techniques known in the art including frothing with air or other gases or generating gases or vapors internally by incorporating into the polymer prior to the final hardening stage a material or materials which volatilize, decompose or react to produce gaseous products which escape during said final thermally induced hardening stage to generate porosity therein.

Among the most readily available foamed rigid plastics on the market are the phenolic types and the unsaturated thermosetting or cross-linkable polyesters, but any rigid and sufficiently refractory foamed materials of this type can be used provided they are atomized, ground or otherwise subdivided sufficiently to meet the criteria specified above for ingredient (d) of this invention.

It should be explicitly understood that the above five subclasses of possible ingredient (d) materials is intended primarily as a representative list of most of the readily available and acceptable types but not as an exhaustive list of all suitable materials. For example, a wide variety of synthetic zeolite (molecular sieve) type materials have become commercially available, some of which have suitable particle sizes, porosities and other characteristics to function effectively in the present invention.

The resin compositions of this invention can be formed by the normal techniques conventionally employed in this art which basically involve forming a "dry" mix of the main ingredients at ambient temperatures and subsequently heating the "dry" mix sufficiently to fuse the resin components while mixing or melt blending the entire composition in a device such as a mixing extruder or an intensive mixer of some kind. The use of premixes of selected portions of the composition is often convenient and may be quite desirable. For example, in the present case a premix of resins (a) and (b) can be employed as a convenience or economical simplification.

On the other hand, the premixing of ingredients (c) and (d) has actually been found to be an advantageous and very desirable alternative since it appears to improve the cooperative functioning of these two additives in the blended resin composition particularly if said premixing is effected at a somewhat elevated temperature (e.g., from about 50° to about 100° C.). It is preferred, therefore, that ingredients (c) and (d) be intimately precombined before being incorporated into the resin composition by mixing them together for several minutes (e.g., about 10 to 30 minutes) at temperatures between about 50° and about 100° C. and which are at least above the melting point of compound (c).

Obviously, various supplemental additives conventionally used in thermoplastics for known additional functions can also be included in the resin compositions of this invention in normal amounts per accepted practice without detrimental effects. These include, for example, mold release agents, pigments, opacifiers, stabilizers, antioxidants, reinforcing agents and the like.

DESCRIPTION OF THE PREFERRED EMBODIMENTS.

The following specific examples are presented to further illustrate the present invention but are not to be construed as limiting the scope of the invention thereto.

EXAMPLE 1

Four parts of CELITE 270 brand diatomaceous silica, (predominantly <325 mesh; oil absorption=150%; specific surface area=about 5 sq. meters/gm), seven parts of KRONITEX 50 brand triaryl phosphate (averaging one isopropyl substituent per molecule) and 1.5 parts of a mold release agent, polyethylene, by weight are milled into 100 parts of a thermoplastic resin blend containing 40% by weight of poly-(2,6-dimethyl-1.4 phenylene) ether resin and 60% by weight of a high impact polystyrene. The resulting mixed composition is chopped into pellets molded into standard test specimens for determining physical properties and measuring vertical burn characteristics in accordance with U.L. Bulletin 94.

As a comparative control, exactly the same ingredients except for the omission of the CELITE 270 diatomaceous silica are milled together, pelletized and molded into standard test specimens.

The average results of testing multiple specimens of the respective compositions in accordance with ASTM procedures are presented in the following table:

| Property Measured | Control | Example 1 |
|---|---|---|
| Heat Deflection Temp at 264 psi | 214° F. | 222° F. |
| Tensile Strength (psi) | 7800 | 7800 |
| Flexural Strength (psi) | 10,400 | 11,300 |
| Flexural Modulus (psi) | 330,000 | 350,000 |
| Notched Izod Imp. Str. (ft.lbs/in) | 4.7 | 1.6 |
| Burn Time to Quench in U.L. Vert. Burn Test (1/16") | 18 secs. | 22 secs. |

The above results indicate that the addition of 4 parts by weight of CELITE 270 in the Example 1 composition improves the heat deflection temperature without causing the quench time in the vertical burn test to exceed the 30 second limit required for a "self-extinguishing" rating.

EXAMPLE 2

Using the same thermoplastic resin blend described in Example 1 (40% polyphenylene ether and 60% HIPS), control batch A containing 1.5 parts of polyethylene and control batch B containing 1.5 parts of polyethylene plus 8 parts of KRONITEX 50 as the only additives per 100 parts by weight of said thermoplastic resin composition are prepared.

Several test batches embodying the present invention are also prepared from the same thermoplastic resin blend, incorporating in each 1.5 parts of polyethylene and 8 parts of KRONITEX 50 but in each case adding said KRONITEX 50 in combination with a finely particulate solid filler with which it has been premixed for 15 minutes at 50° C. in accordance with the following table:

| Batch | Filler & Amount | | Filler Properties Part Size |
|---|---|---|---|
| C | 8 pts. | CELITE$^R$ 521 SILICA | <325 mesh |
| D | 4 pts. | CELITE$^R$ 270 silica | <325 mesh |

-continued

| Batch | Filler & Amount | Filler Properties Part Size |
|---|---|---|
| G | 8 pts. fumed silica[1] | 1 micron |
| H | 8 pts. phenolic resin[2] | <40 mesh |
| J | 8 pts. fumed alumina | 1 micron |

[1]siloxane treated
[2]micro balloons

Each control and test batch is pelletized and molded into standard test specimens and the averaged results of testing same are shown in the following table:

| Batch | Vert. Burn Quench Time (⅛") | HDT (264 psi) |
|---|---|---|
| Control A | >30 secs; burns | 244 |
| Control B | 12.2 secs. | 217 |
| Test C | 12.3 secs. | 227 |
| Test D | 18.0 secs. | 229 |
| Test G | 12.4 secs. | 223 |
| Test H | 17.1 secs. | 222 |
| Test J | 19.3 secs. | 226 |

In addition to the options and alternatives already taught or indicated hereinabove, many other possible changes and logical modifications of the present invention will be obvious to those skilled in the art. It is, therefore, to be explicitly understood that the scope of the present invention is fully commensurate with the appended claims.

We claim:

1. A thermoplastic composition comprising:
   (a) a polyphenylene ether resin;
   (b) a styrene type resin;
   (c) an organophosphorus compound having a melting point below about 100° C. and which is stable and relatively non-volatile at temperatures up to at least about 300° C.; and
   (d) a finely particulate solid filler having a relatively high absorption capacity for organic liquids.

2. A composition as defined in claim 1 wherein the polyphenylene ether resin (a) contains repeating structural units conforming to the general formula

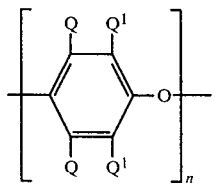

wherein the ether oxygen atom of one unit is connected to the benzene nucleus of the next adjoining unit; n is a positive integer equal to at least 50 and each Q and $Q^2$ is a monovalent substituent selected from the group consisting of halogen, hydrogen, hydrocarbon radicals, halohydrocarbon radicals, hydrocarbonoxy radicals and halohydrocarbonoxy radicals provided that none of said radicals contains an alpha-carbon atom which is tertiary or bears a halogen substituent, and the styrene type resin (b) has at least 10 percent by weight polymer units derived from a compound corresponding to the formula:

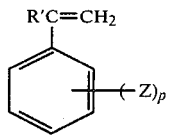

where R is hydrogen, lower alkyl or halogen; Z is a member of the group consisting of vinyl, halogen and lower alkyl; and p is a whole number equal to from 0 to 5.

3. A composition as defined in claim 1 wherein said organophosphorus compound (c) is an aryl derivative of phosphine or of one of the phosphorus acids, and said finely particulate solid filler (d) has an average primary particle size of less than about 250 mils and an oil absorption capacity at least about equal to its own weight.

4. A composition as defined in claim 1 wherein resin components (a) and (b) are present in relative proportions between about 1 to 4 and about 4 to 1 by weight and the weight ratio of additive (d) to additive (c) is between about 1 to 3 and 3 to 1.

5. A composition as defined in claim 4 wherein the proportion of additive (c) is between about 4 and about 25 parts by weight per 100 part of (a) and (b) combined and the proportion of additive (d) is between about 2 and about 30 parts by weight per 100 parts of (a) and (b) combined.

6. A thermoplastic composition comprising:
   (a) from about 20 to about 90 parts by weight of a poly(2,6-dimethyl-1, 4-phenylene) ether resin;
   (b) from about 10 to about 80 parts by weight of a high impact styrene type resin;
   (c) from about 4 to about 25 parts by weight per 100 parts of (a) and (b) combined of an aryl organophosphorus compound which is liquid at temperatures below about 100° C. and stable and relatively non-volatile at temperatures up to about 300° C.; and
   (d) from about 2 to about 30 parts by weight of a finely particulate solid filler having an openly porous or expanded network structure capable of absorbing organic liquids in amounts about equal to its own weight.

7. A composition as defined in claim 6 wherein said aryl organophosphorus compound (c) is from the group consisting of phosphine oxides, phosphonic or phosphinic acids and their esters, esters or partial esters of phosphoric or phosphorus acids and esters of condensed or complexed phosphorus polyacids.

8. A composition as defined in claim 7 wherein said aryl organophosphorus compound contains 1 to 3 organic substituents per molecule and at least two of said substituents contain an aryl structure.

9. A composition as defined in claim 8 wherein said compound contains 3 organic substituents each of which contains an aryl structure.

10. A composition as defined in claim 6 wherein said finely particulate solid filler (d) is from the group consisting of diatomaceous silicas, porous silicate minerals including zeolites, fumed oxides of metals or metalloids, wet process or precipitated oxides and porous, rigid polymeric fillers.

11. A composition as defined in claim 6 wherein said finely particulate solid filler is a natural or synthetic siliceous material with a particulate size of less than about 250 mils.

12. A composition as defined in claim 6 wherein said aryl organophosphorus compound (c) and said finely particulate solid filler (d) are premixed together at a temperature of at least 50° C. prior to being incorporated with resin components (a) and (b).

13. A composition as defined in claim 6 wherein said compound (c) and filler (d) are premixed for several minutes at a temperature in the range of about 50° C. to about 100° C. which is at least about the melting point of compound (c).

* * * * *

UNITED STATES PATENT AND TRADEMARK OFFICE
CERTIFICATE OF CORRECTION

PATENT NO. : 4,233,199
DATED : November 11, 1980
INVENTOR(S) : Visvaldis Abolins et al It is certified that error appears in the above—identified patent and that said Letters Patent is hereby corrected as shown below:

In Col. 2, line 50, "oranophosphorus" should read -- organophosphorus --.

In Col. 3, line 55, "rols" should read -- roles --.

Signed and Sealed this

Eighteenth Day of August 1981

[SEAL]

Attest:

Attesting Officer

GERALD J. MOSSINGHOFF
Commissioner of Patents and Trademarks